US007321763B2

(12) United States Patent
Tanaka et al.

(10) Patent No.: US 7,321,763 B2
(45) Date of Patent: Jan. 22, 2008

(54) COMMUNICATION TERMINAL RECEIVING CONNECTION INFORMATION FROM A CELLULAR PHONE AND COMMUNICATION SYSTEM INCLUDING SUCH A COMMUNICATION TERMINAL

(75) Inventors: Hiroshi Tanaka, Asaka (JP); Masahiro Terada, Asaka (JP); Yukihiro Kawada, Asaka (JP)

(73) Assignee: Fujifilm Corporation, Tokyo (JP)

( * ) Notice: Subject to any disclaimer, the term of this patent is extended or adjusted under 35 U.S.C. 154(b) by 1098 days.

(21) Appl. No.: 10/020,240

(22) Filed: Dec. 18, 2001

(65) Prior Publication Data

US 2002/0082001 A1    Jun. 27, 2002

(30) Foreign Application Priority Data

Dec. 27, 2000  (JP)  .............................. 2000-397729

(51) Int. Cl.
*H04M 3/42* (2006.01)
(52) U.S. Cl. .................................... 455/414.1; 348/552
(58) Field of Classification Search ............ 455/412.1, 455/414.1, 418, 419, 450, 422.1, 426.1, 426.2, 455/550.1, 552.1, 553.1, 554.2, 556.1, 557, 455/3.1, 6.3, 158; 340/5.61; 370/328, 358; 348/552, 14.02, 373
See application file for complete search history.

(56) References Cited

U.S. PATENT DOCUMENTS

| | | | | |
|---|---|---|---|---|
| 5,893,037 A * | 4/1999 | Reele et al. | ............. | 455/556.1 |
| 5,943,603 A * | 8/1999 | Parulski et al. | ............. | 725/133 |
| 6,499,016 B1 * | 12/2002 | Anderson | .................... | 704/275 |
| 6,535,243 B1 * | 3/2003 | Tullis | ....................... | 348/207.1 |
| 6,564,070 B1 * | 5/2003 | Nagamine et al. | ........ | 455/556.1 |
| 6,573,938 B1 * | 6/2003 | Schulz et al. | ................ | 348/373 |
| 6,618,578 B1 * | 9/2003 | Petite | ............................ | 455/92 |
| 6,642,959 B1 * | 11/2003 | Arai | ......................... | 348/231.3 |
| 6,741,864 B2 * | 5/2004 | Wilcock et al. | ........... | 455/456.1 |
| 6,763,247 B1 * | 7/2004 | Hollstrom et al. | ........ | 455/556.1 |
| 6,853,711 B2 * | 2/2005 | Brisebois et al. | ........ | 379/142.06 |

(Continued)

FOREIGN PATENT DOCUMENTS

JP    09-289974    11/1997

(Continued)

*Primary Examiner*—Rafael Perez-Gutierrez
*Assistant Examiner*—My X Nguyen
(74) *Attorney, Agent, or Firm*—Birch, Stewart, Kolasch & Birch, LLP

(57) ABSTRACT

The communication terminal and a communication system is capable of eliminating necessity of complicated setting inputs related to communication in a communication terminal in performing dial-up connection to a communication apparatus on a network from the communication terminal. Since the communication terminal and the communication system are provided with a receiving device which receives connection information such as a dial-up telephone number, attribute information, a URL, an IP address, gateway information and a DNS that is required for making communication connection to a photograph sharing service on the Internet from a cellular phone and a transmitting and receiving device (transmitting and receiving device) which sends and receives information such as an image to and from the photograph sharing service based on the connection information received from the cellular phone, it becomes possible to eliminate necessity of complicated setting inputs related to communication in an electronic camera in performing dial-up connection to the Internet from the electronic camera.

6 Claims, 12 Drawing Sheets

U.S. PATENT DOCUMENTS

| | | | |
|---|---|---|---|
| 6,968,365 B2* | 11/2005 | Hollstrom et al. | 709/217 |
| 7,082,227 B1* | 7/2006 | Baum et al. | 382/311 |
| 2001/0026376 A1* | 10/2001 | I'Anson | 358/400 |
| 2002/0036698 A1* | 3/2002 | Mizutani | 348/232 |
| 2002/0066115 A1* | 5/2002 | Wendelrup | 725/153 |
| 2003/0030839 A1* | 2/2003 | Walters et al. | 358/1.15 |
| 2003/0103144 A1* | 6/2003 | Sesek et al. | 348/207.1 |

FOREIGN PATENT DOCUMENTS

| | | |
|---|---|---|
| JP | 09-322114 | 12/1997 |
| JP | 10341302 A | 12/1998 |
| JP | 11136612 A | 5/1999 |
| JP | 2000-324196 | 11/2000 |
| WO | WO 00/01138 A2 | 1/2000 |
| WO | WO 00/72577 A1 | 11/2000 |

* cited by examiner

[FIG.1]
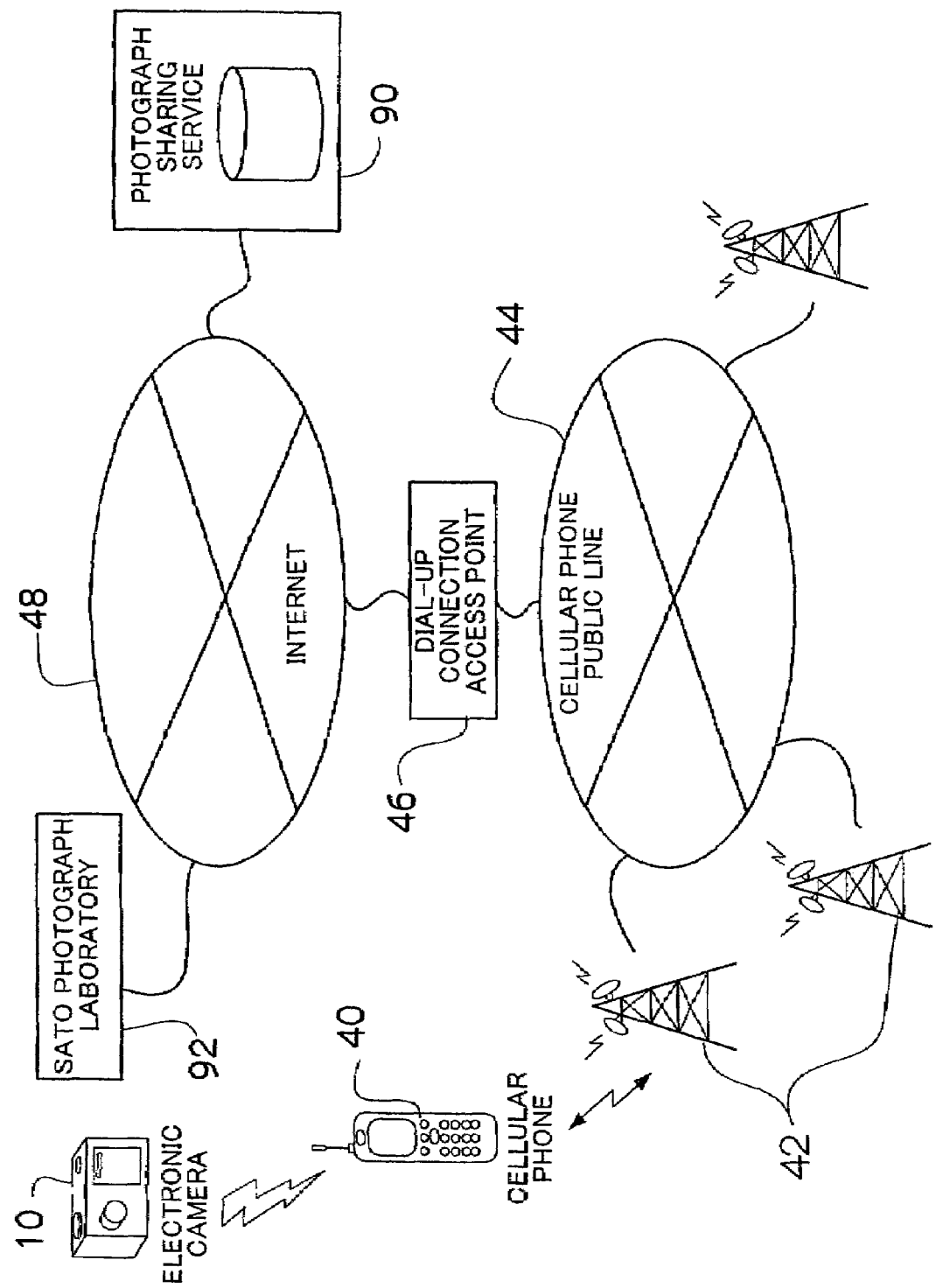

[FIG.2]
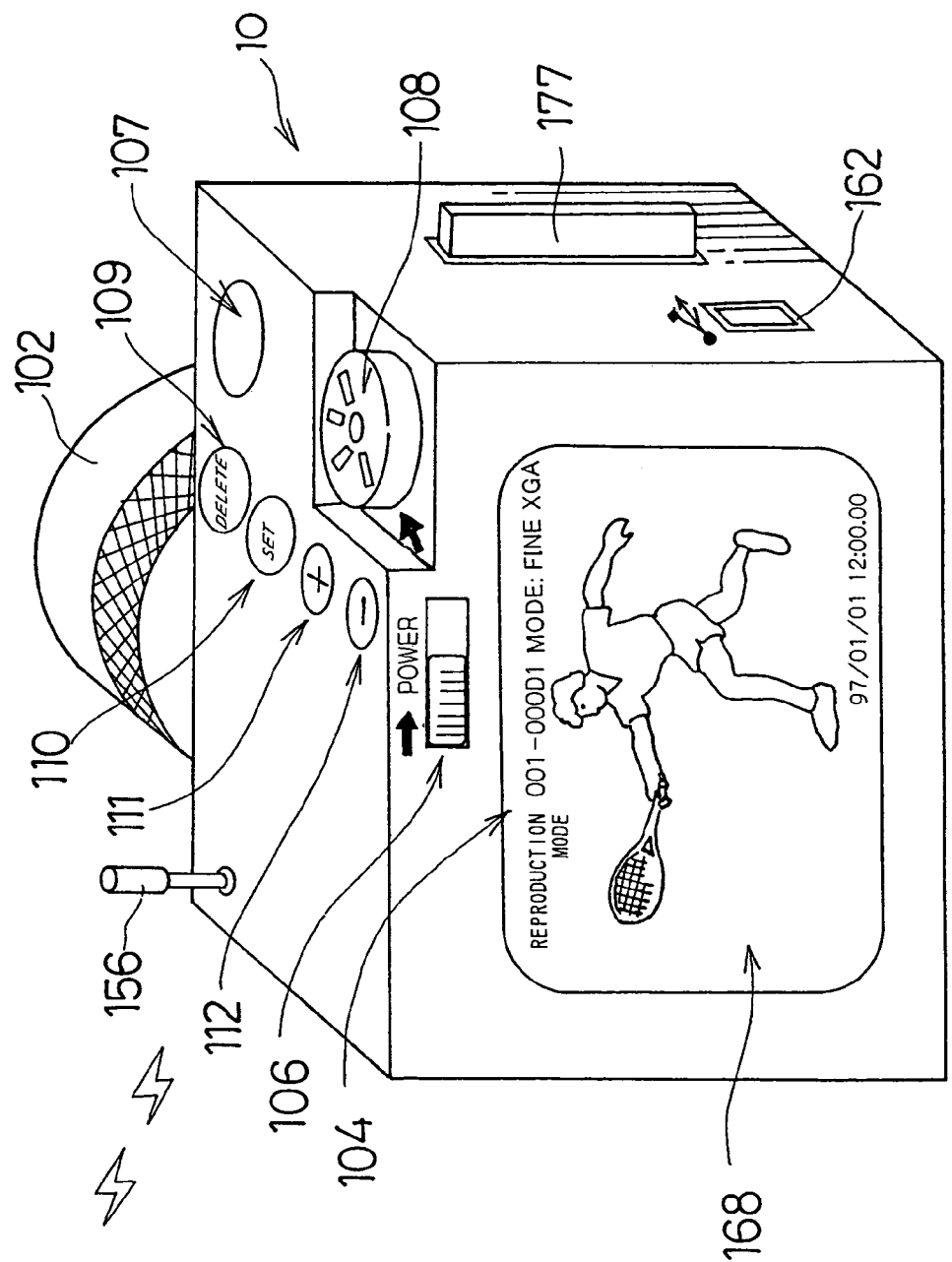

[FIG.3]
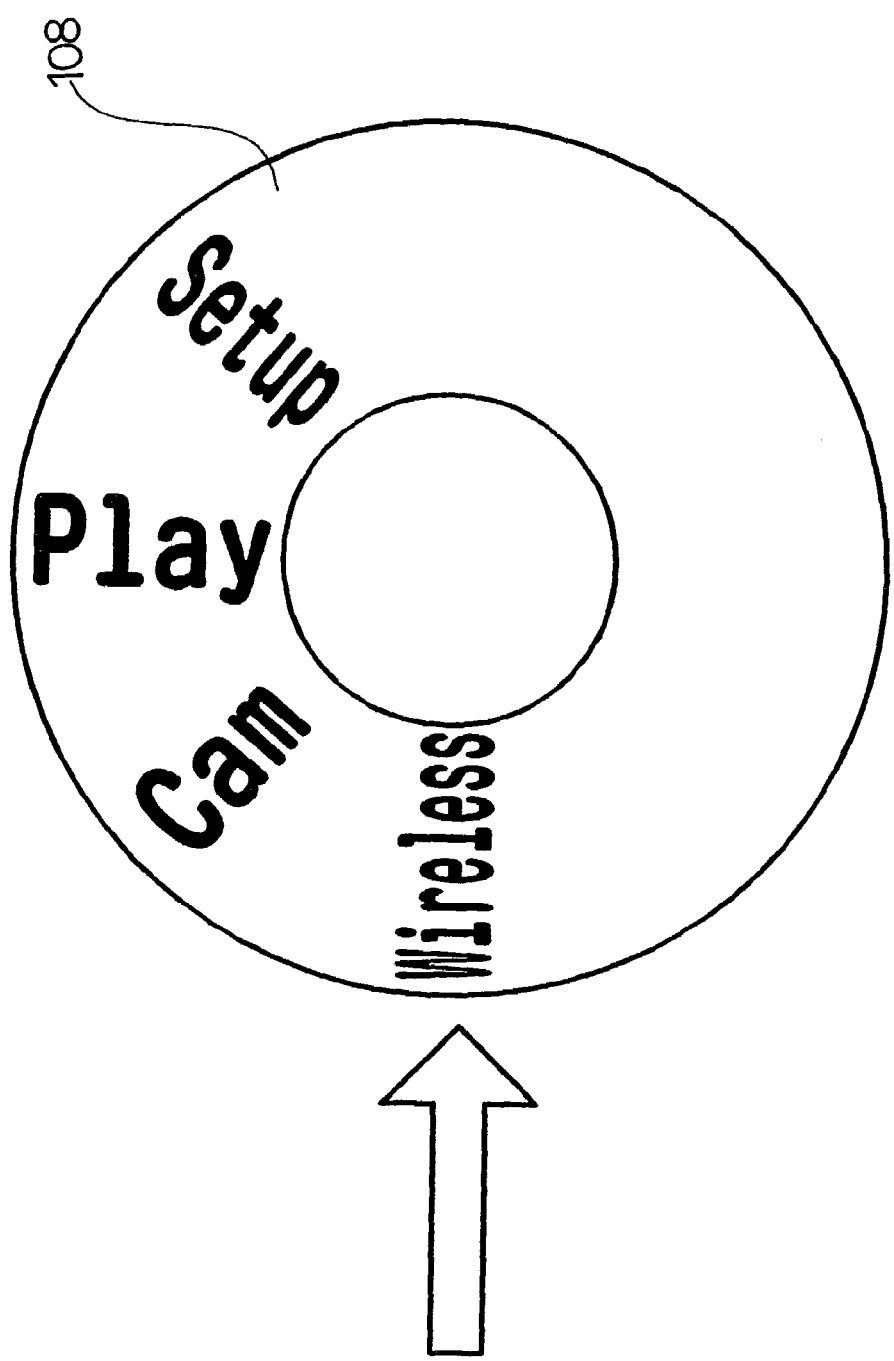

[FIG. 4]
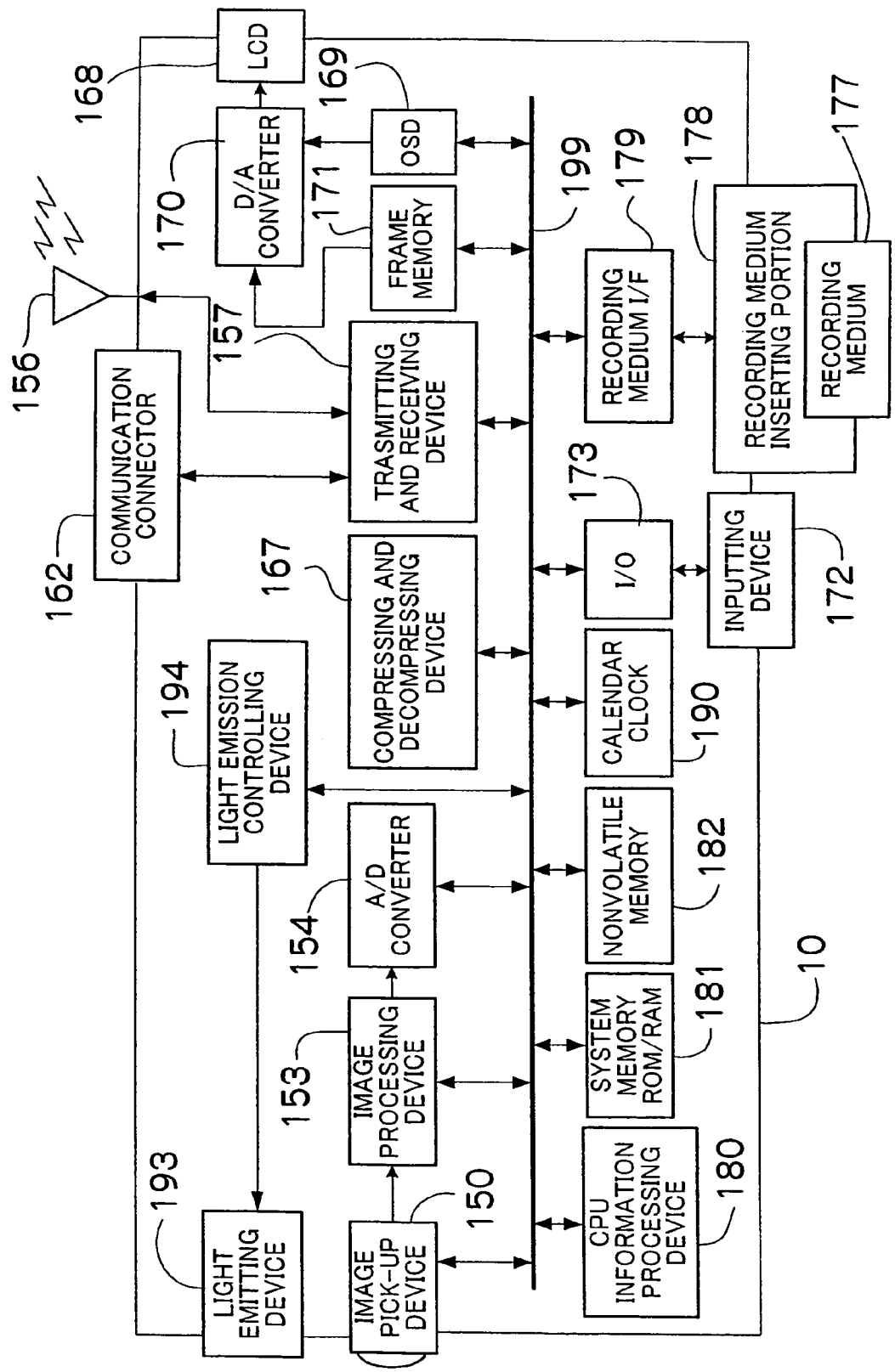

[FIG.5]
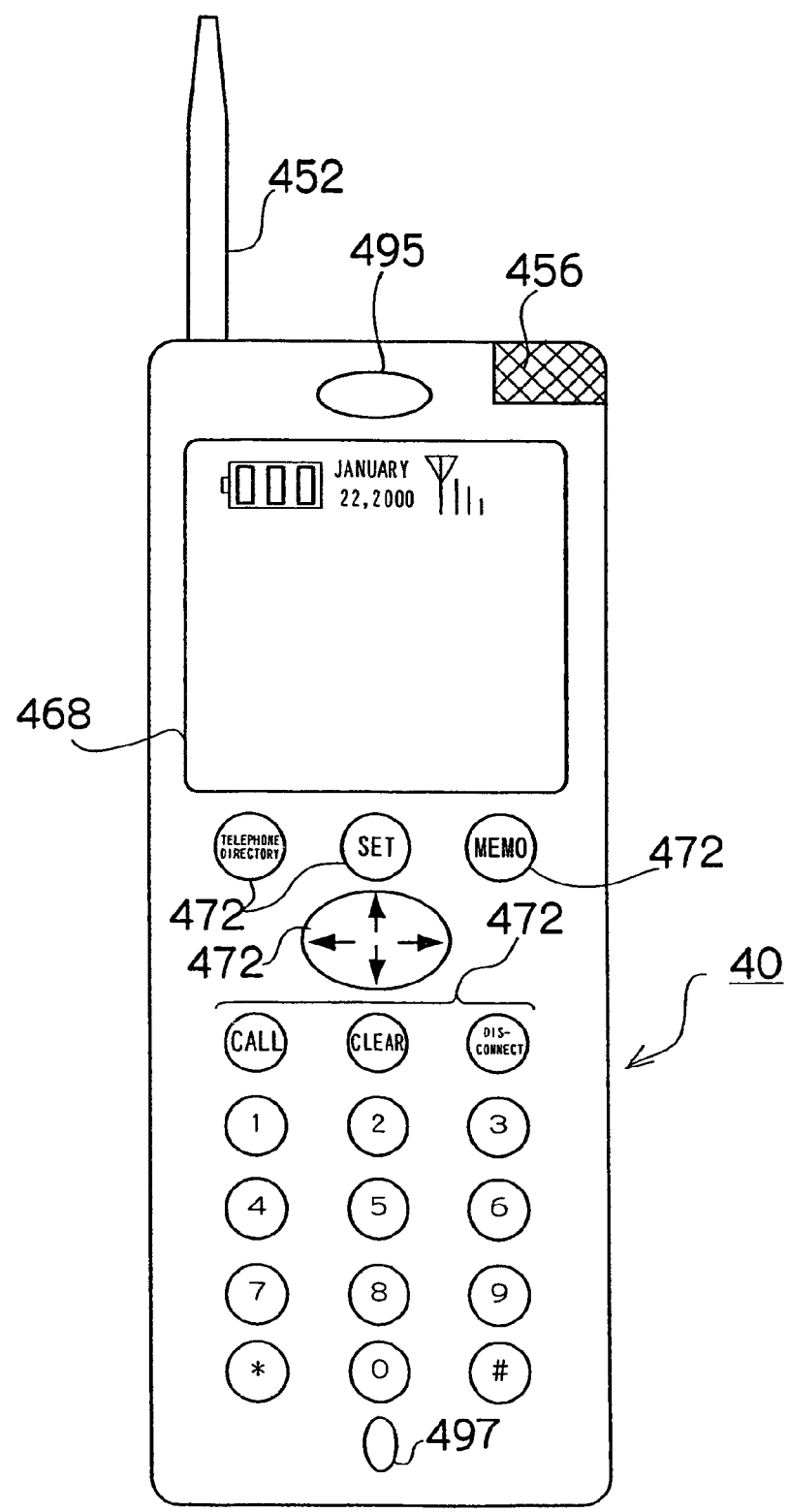

[FIG.6]
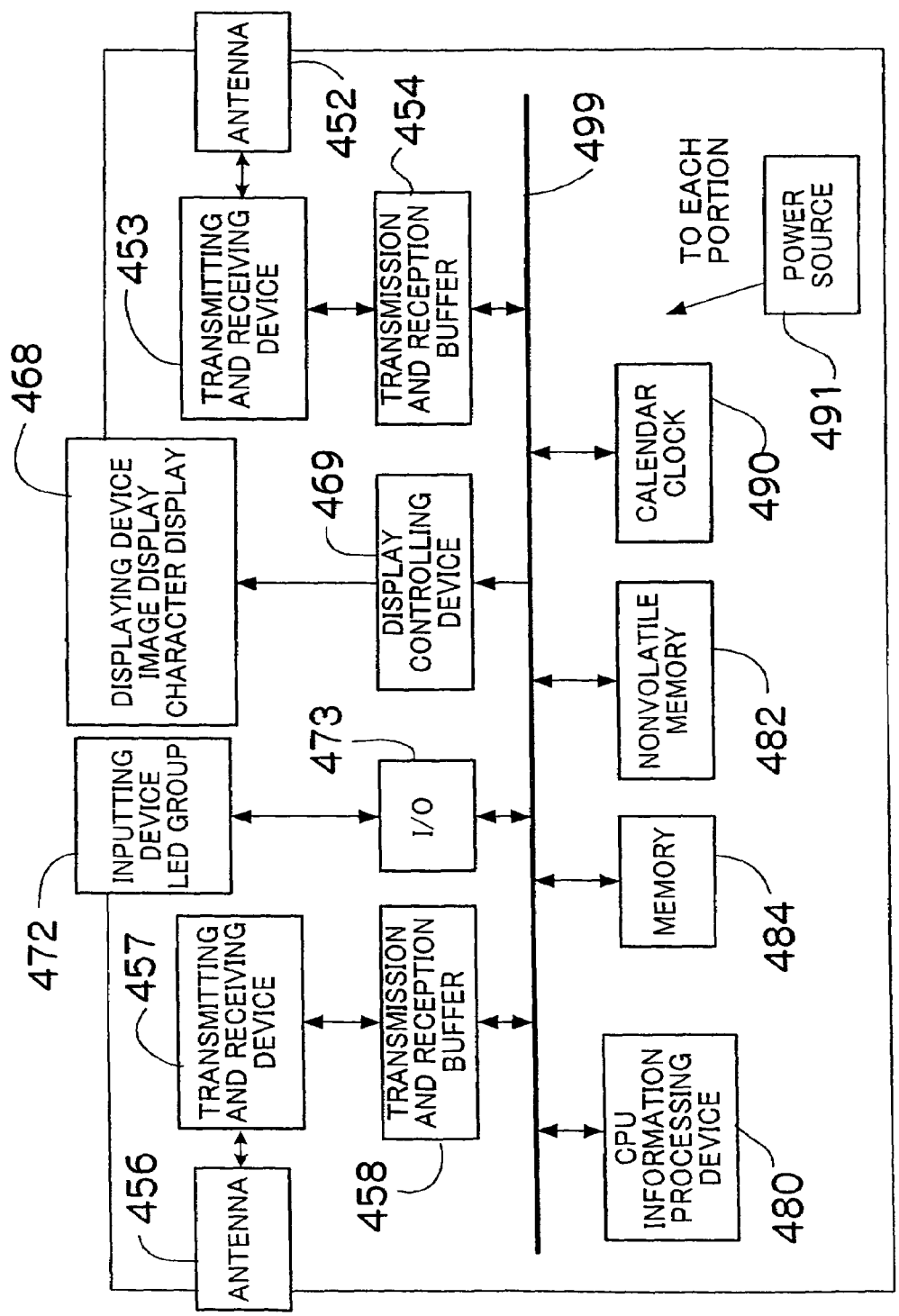

[FIG. 7]

| ATTRIBUTE | | TEL | TEL | DIALUP | DIALUP | FAX | DIALUP |
|---|---|---|---|---|---|---|---|
| NAME | | TARO YAMADA | HANAKO SUZUKI | SATO PHOTOGRAPH LABORATORY | IMAGE SHARING SERVICE | FAX IN OFFICE | MUSIC DISTRIBUTION SERVICE |
| TELEPHONE NUMBER | | 048-111-111 | 090-5432-1234 | 03-9876-5432 | 03-9876-5432 | 048-555-8765 | 03-9876-5432 |
| ADDRESS | IP | — | — | DHCP | DHCP | | DHCP |
| | DNS | — | — | 255.123.xxx.xxx | 255.123.xxx.xxx | — | 255.123.xxx.xxx |
| | WINSE | — | — | 255.123.yyy.yyy | 255.123.yyy.yyy | — | 255.123.yyy.yyy |
| | GATEWAY | | — | DEFAULT | DEFAULT | — | DEFAULT |
| DEFAULT | | — | — | http://www.marupeke.com | http://www.gazokyoyuu.co.jp | — | http://www.ongakuhaishin.co.jp |
| URL | | | | | | | |

[FIG.8]
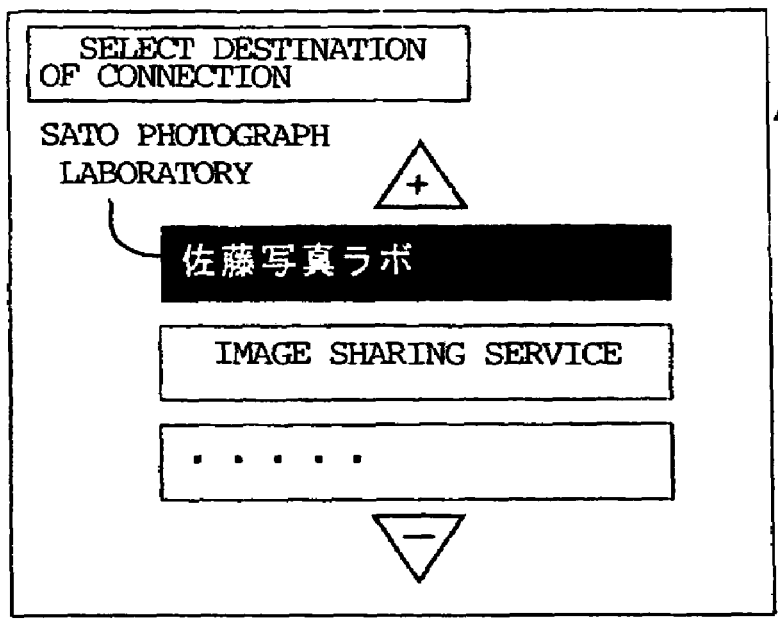
[FIG.9]
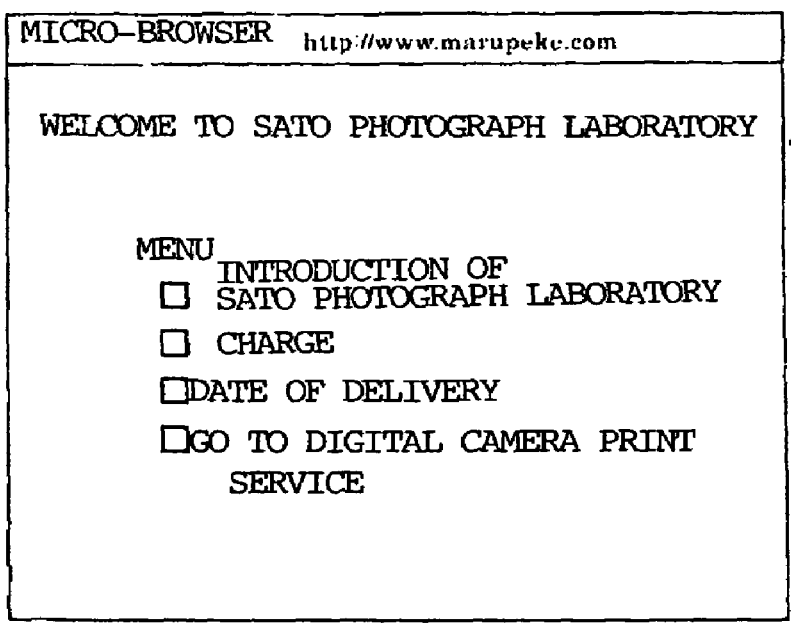

[FIG.10]
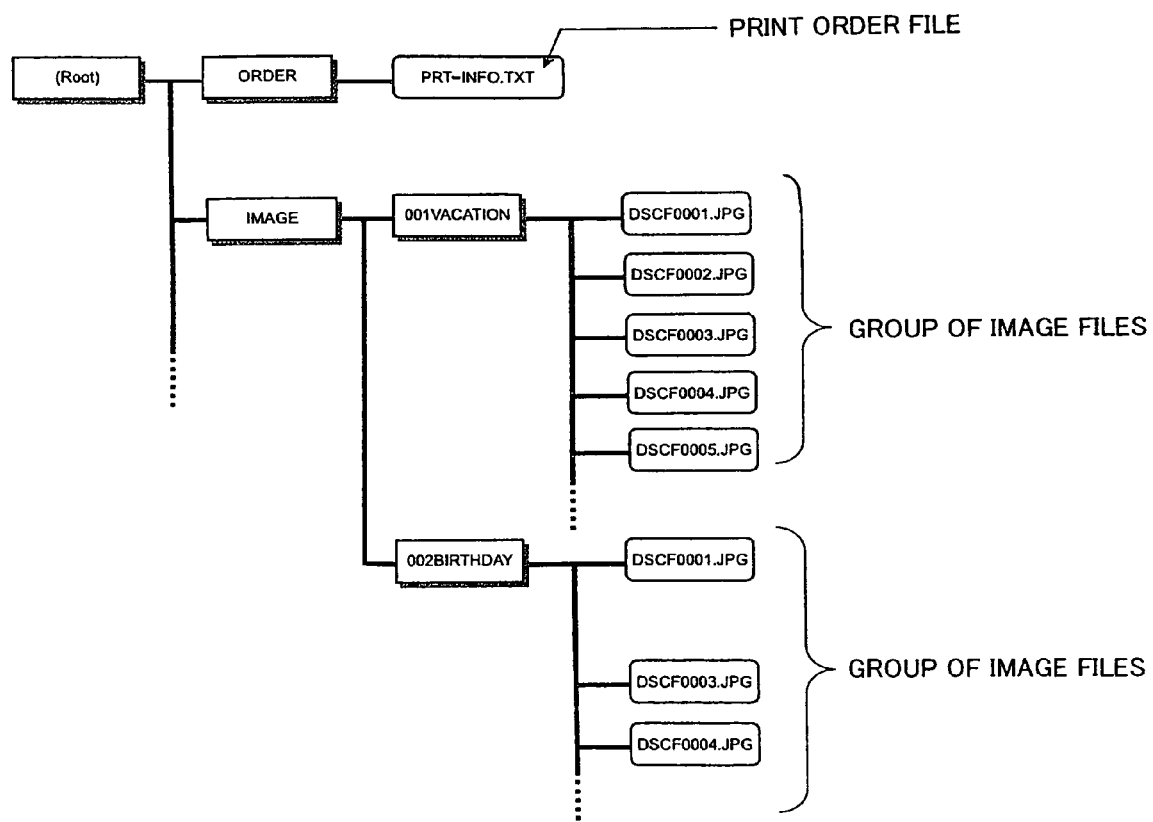

[FIG.11]
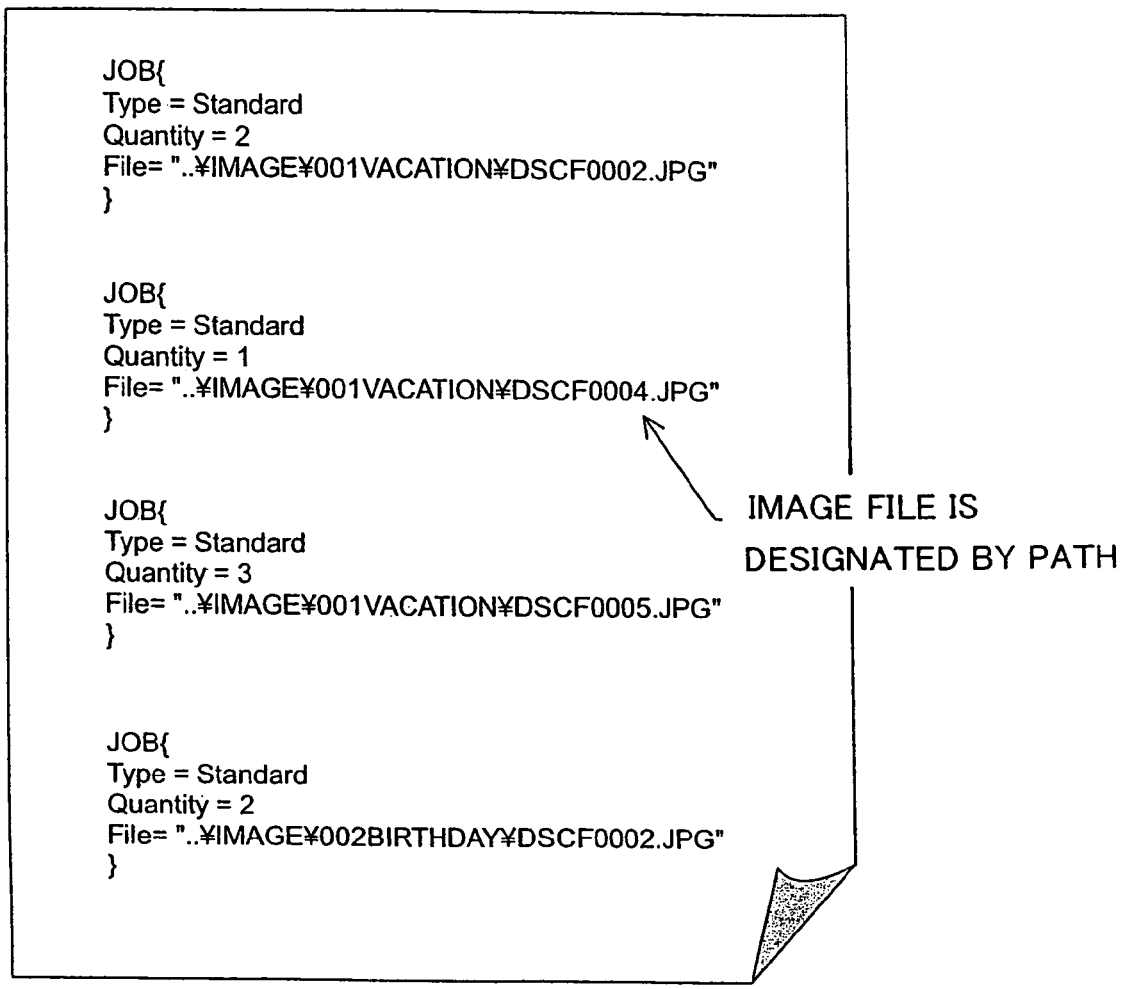

[FIG.12]

| ATTRIBUTE | TEL | TEL | DIALUP | DIALUP | FAX |
|---|---|---|---|---|---|
| SERVICE | | | PRINT SERVICE | IMAGE SHARING SERVICE | FAX IN OFFICE |
| NAME | TARO YAMADA | HANAKO SUZUKI | XX PHOTOGRAPH LABORATORY | | |
| TELEPHONE NUMBER | 048-111-111 | 090-5432-1234 | 03-9876-5432 | 03-9876-5432 | 048-555-8765 |
| SERVER TYPE | — | — | PPP | PPP | — |
| PROTOCOL | — | — | TCP/IP | TCP/IP | — |
| IP ADDRESS | — | — | DHCP | DHCP | — |
| DNS | — | — | 255.123.xxx.xxx | 255.123.xxx.xxx | — |
| WINSE | — | — | 255.123.yyy.yyy | 255.123.yyy.yyy | — |
| GATEWAY | — | — | DEFAULT | DEFAULT | — |
| DEFAULT URL | — | — | http://www.marupeke.com | http://www.gazokyoyuu.co.jp | — |

[FIG.13]
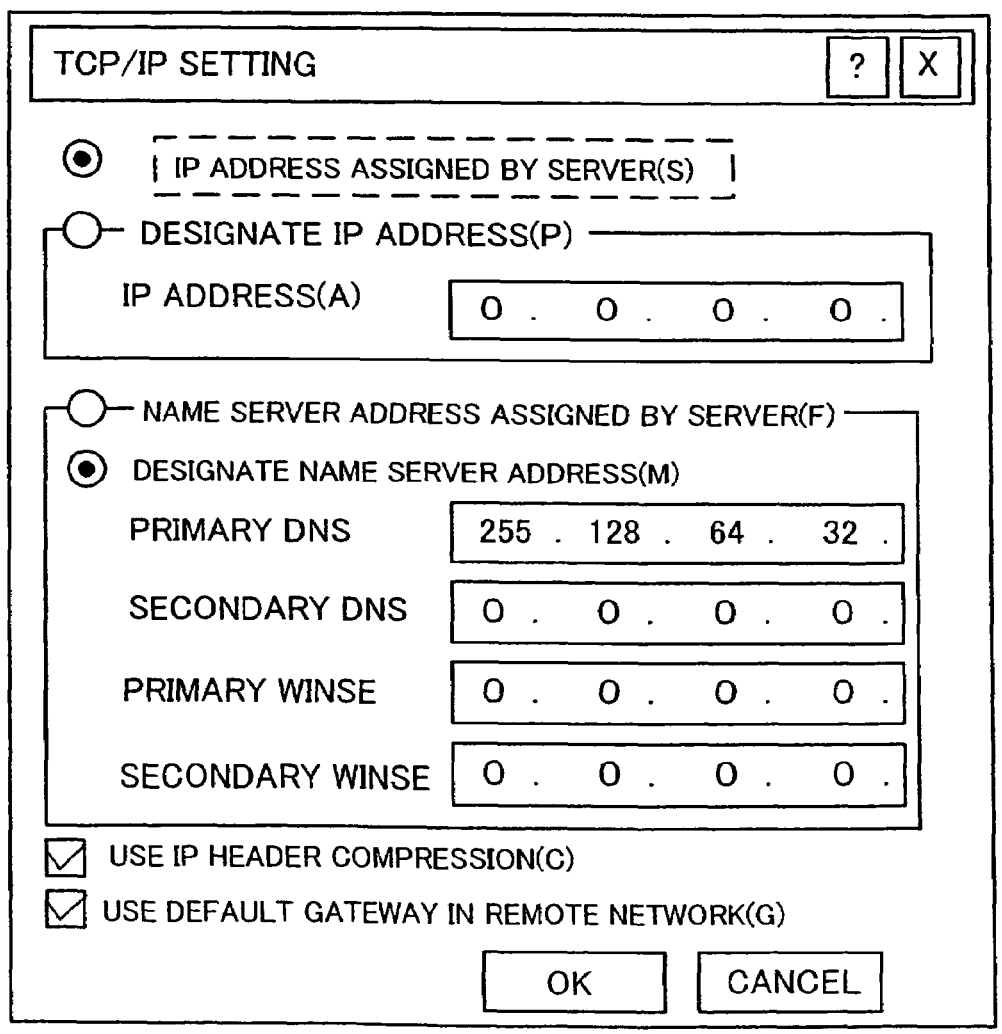

COMMUNICATION TERMINAL RECEIVING CONNECTION INFORMATION FROM A CELLULAR PHONE AND COMMUNICATION SYSTEM INCLUDING SUCH A COMMUNICATION TERMINAL

BACKGROUND OF THE INVENTION

1. Field of the Invention

The present invention relates to a communication terminal and a communication system and, in particular, to a communication terminal and a communication system that are capable of sending and receiving information such as an image to and from a communication apparatus on a network via a cellular phone.

2. Description of the Related Art

Japanese Patent Application Publication No. 10-341302 discloses an electronic image pick-up apparatus for picking up an image of a subject, which outputs control information for controlling a portable terminal communicating with a communication apparatus wirelessly based on a predetermined operation applied to the electronic image pick-up apparatus.

However, with this electronic image pick-up apparatus, the electronic image pick-up apparatus functions as a main user interface to control a cellular phone. In addition, although the electronic image pick-up apparatus is capable of storing telephone numbers, if necessary, it causes a lot of futility in terms of system configuration to manage telephone numbers in the electronic image pick-up apparatus whose main function is not wireless communication. Further, in order to make connection to the Internet or the like and send and receive information, setting of TCP/IP or the like and setting for dial-up connection must be carried out. Thus, there has been caused inconvenience in that it is difficult and complicated to input the information and carry out the settings via an inputting device and a displaying device for confirmation of the electronic image pick-up apparatus that is generally not provided with special purpose character input keys and the like.

Japanese Patent Application Publication No. 11-136612 discloses an electronic camera that is configured to associate photographed electronic image information with peculiar designated destination number information (ID number, telephone number or the like) that is a destination of transmission of the information and store both the electronic image information and the designated destination number information. With this electronic camera, a telephone number of a destination of transmission of an image is recorded together with recorded image data and the image is sent to the destination of transmission of the telephone number using some transmitting device.

However, even if the electronic camera is used, it causes a lot of futility in terms of system configuration to manage telephone numbers in the electronic image pick-up apparatus whose main function is not wireless communication. Moreover, various settings for making communication connection to the Internet or the like must be carried out. Thus, there has been caused inconvenience in that it is difficult and complicated to do so.

SUMMARY OF THE INVENTION

The present invention has been devised in view of these problems, and it is an object of the present invention to provide a communication terminal and a communication system that are capable of eliminating necessity of complicated setting inputs related to communication in the communication terminal in performing dial-up connection to a communication apparatus on a network such as the Internet from the communication terminal.

In order to attain the above-described object, the present invention is directed to a communication terminal which is capable of sending and receiving information such as an image to and from a communication apparatus on a network via a cellular phone, which is characterized by comprising: a receiving device which receives connection information such as a dial-up telephone number, attribute information, a URL, an IP address, gateway information and a DNS for making communication connection to a communication apparatus on a network from the cellular phone; and a transmitting and receiving device which sends and receives information such as an image to and from the communication apparatus on the network based on the connection information received from the above-described cellular phone.

According to the present invention, since the communication terminal is provided with a receiving device which receives connection information such as a dial-up telephone number, attribute information, a URL, an IP address, gateway information and a DNS for making communication connection to a communication apparatus on a network from the cellular phone and a transmitting and receiving device which sends and receives information such as an image to and from the communication apparatus on the network based on the connection information received from the above-described cellular phone, it becomes possible to eliminate necessity of complicated setting inputs related to communication in the communication terminal in performing dial-up connection to the Internet or the like from the communication terminal.

In addition, in order to attain the above-described object, the present invention is also directed to a communication system which is capable of sending and receiving information such as an mage to and from a communication apparatus on a network via a cellular phone, which is characterized by comprising: a cellular phone provided with a recording device which records connection information such as a dial-up telephone number, attribute information, a URL, an IP address, gateway information and a DNS for making communication connection to a communication apparatus on a network, a transmitting device which sends the above-described connection information to a communication terminal, a first receiving device which receives the information such as an image from the above-described communication terminal and a first transmitting and receiving device which sends and receives information to and from the communication apparatus on the network; and a communication terminal provided with a second receiving device which receives connection information for making communication connection to the communication apparatus on the network from the above-described cellular phone and a second transmitting and receiving device which sends and receives the information such as an image to and from the communication apparatus on the network based on the connection information received from the above-described cellular phone.

According to the present invention, since the communication system comprises a cellular phone provided with a recording device which records connection information such as a dial-up telephone number, attribute information, a URL, an IP address, gateway information and a DNS for making communication connection to a communication apparatus on a network, a transmitting device which sends the above-described connection information to a communication terminal, a first receiving device which receives the information such as an image from the above-described communication terminal and a first transmitting and receiving device which sends and receives information to and from the communication apparatus on the network and a communication terminal provided with a second receiving device which receives connection information for making communication connection to the communication apparatus on the network from the above-described cellular phone and a second transmitting and receiving device which sends and receives the information such as an image to and from the communication apparatus on the network based on the connection information received from the above-described cellular phone, it becomes possible to eliminate necessity of complicated setting inputs related to communication in the communication terminal in performing dial-up connection to the Internet or the like from the communication terminal.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 1 is a view showing a communication system including an electronic camera and a cellular phone in accordance with the present invention;

FIG. 2 is an external perspective view of the electronic camera;

FIG. 3 illustrates indications of various setting modes provided in a mode switching dial;

FIG. 4 is a block diagram of a signal processing system of the electronic camera;

FIG. 5 is an external view of the cellular phone;

FIG. 6 is a block diagram of a signal processing system of the cellular phone;

FIG. 7 is a table showing information of a telephone directory recorded by a nonvolatile memory of the cellular phone;

FIG. 8 illustrates selection menus of destinations of dial-up connection displayed on a displaying device of the electronic camera;

FIG. 9 illustrates a display example of browser software to be displayed on the displaying device of the electronic camera;

FIG. 10 illustrates a directory structure of image files and print order files recorded in a recording medium of the electronic camera;

FIG. 11 illustrates a description example of a print order file;

FIG. 12 is a table showing information of a telephone directory recorded by the nonvolatile memory of the cellular phone; and FIG. 13 illustrates TCP/IP information to be set on a screen of a personal computer.

DETAILED DESCRIPTION OF THE PREFERRED EMBODIMENTS

Preferred embodiments of a communication terminal and a communication system in accordance with the present invention will be hereinafter described with reference to the accompanying drawings.

FIG. 1 shows a communication system including a communication terminal and a cellular phone in accordance with the present invention.

According to the figure, the communication system is composed of an electronic camera 10 that is a communication terminal provided with an image pick-up device, a wireless communication apparatus and the like, a cellular phone 40 that is a communication apparatus provided with a wireless communicating device, a recording device and the like, base stations 42 to be direct destinations of connection of the cellular phone 40 via a public line, cellular phone public line 44 for the cellular phone 40, an access point 46 for the electronic camera 10 to perform dial-up connection to a network, a communication network such as the Internet 48, a photograph sharing service 90 that is a server to be a destination of communication for sending and receiving information such as an image to and from the electronic camera 10 and a photograph laboratory 92.

The electronic camera 10 is capable of sending and receiving information such as an image to and from the cellular phone 40 by a short distance wireless communication apparatus. In addition, the cellular phone 40 is capable of sending and receiving information to and from the access point 46 by a communicating device of the cellular phone public line 44. Therefore, the electronic camera 10 is capable of making communication connection to the access point 46 by PPP (Point to Point Protocol) via the cellular phone 40 and the cellular phone public line 44, making communication connection using TCP/IP via the Internet 48 and sending and receiving image data, service information and the like to and from the server of the photograph sharing service 90, the photograph laboratory 92 and the like.

FIG. 2 shows an external perspective view of an electronic camera that is a form of a communication terminal provided with a wireless communication apparatus.

According to the figure, the electronic camera 10 is provided with a photographing lens 102 for imaging a subject image on an image pick-up device, a displaying device 168 which displays various kinds of information such as image data, a communication status and a frame number indication 104, a power switch 106 for inputting activation and stop of functions of the electronic camera 10, a release button 107 with which a user instructs photographing, a mode switching dial 108 for switching to set various mode provided in the electronic camera 10, an erasing button 109 for designating a desired item in erasing the desired item from items displayed on the displaying device 168, a setting button 110 for designating a desired item from items displayed on the displaying device 168, an increment button 111 that is operated for incrementing a frame number or the like displayed on the displaying device 168 and a decrement button 112 that is operated for decrementing a frame number or the like displayed on the displaying device 168.

In addition, the electronic camera 10 is also provided with an antenna 156 for sending and receiving a carrier wave and data when information such as image data and voice data is sent to or received from an external communication apparatus by wireless communication, a communication connector 162 that is used when wire communication is performed and a detachable recording medium 177 that records information such as an image.

FIG. 3 is a view showing an indication of various setting modes provided in the mode switching dial 108.

According to the figure, on the mode switching dial 108, there are shown a communication mode for carrying out wireless communication with other communication apparatuses (shown as Wireless in FIG. 3), a photographing mode for carrying out photographing (shown as Cam in FIG. 3), a reproducing mode for carrying out reproduction of a recorded image (shown as Play in FIG. 3) and a set-up mode for setting the photographing mode, the number of photographing pixels, an automatic turning-off time of a power source, a volume of alarm sound or the like. Thus, a user can set processing mode of the electronic camera 10 in the predetermined mode by switching the mode switching dial 108.

FIG. 4 is a block diagram of a signal processing system of the electronic camera 10.

An image processing portion of the electronic camera 10 is provided with an image pick-up device 150 which images an image of a subject on a light-receiving surface to photoelectrically convert it and output the converted image as image data, an image processing device 153 which performs processing such as change of an image size, sharpness correction, gamma correction, contrast correction and white balance correction and an A/D converter 154 for converting an analog image signal to digital image data.

A communicating device of the electronic camera 10 which sends and receives image data or the like to and from other communication apparatuses by communication is composed of a transmitting and receiving device 157 for short distance (including functions of a transmitting device and a receiving device) which sends or receives information such as image data on a carrier wave, an antenna 156 for sending and receiving a carrier wave and data and a communication connector 162 for sending information such as image data to other communication apparatuses via a communication cable.

In addition, the electronic camera 10 is provided with a compressing and decompressing device 167 which performs processing for controlling to compress information such as image data with a method represented by JPEG and Motion JPEG or controlling to extend and develop compressed data, an OSD 169 for displaying on screen data or the like of various characters and messages, which are displayed on the displaying device 168, together with an image, a D/A converter 170 for converging digital image data to a YC signal, an RGB signal or the like for display and a frame memory 171 for temporarily storing image data.

In addition, the electronic camera 10 is provided with an inputting device 172 on which a release button, a communication button, a transmission button, a function switch, a crucifix key, a decision switch, a mode switching switch and the like are provided, an I/O 173 that is an interface for inputting and outputting setting information or the like of the inputting device 172, a recording medium insertion portion 178 for detachably inserting a recording medium 177 and a recording medium interface 179 for recording information such as image data in the recording medium 177 and reading the image data therefrom. Further, the recording medium 177 is a detachable recording medium represented by a semiconductor recording medium such as a memory card, a magnetic recording medium, represented by an MO or the like, and an optical recording medium or the like.

In addition, the electronic camera 10 is provided with an information processing device 180 which performs control of the entire electronic camera 10 and, at the same time, performs control such as sampling timing control of image data, recording control of image data, pattern recognition of image data, processing for reading type of machine information or peculiar identification information of the electronic camera 10, generating processing of a random number for identification, communication control and display control, a system memory 181 including an ROM in which peculiar identification information such as a type name and a serial number of the electronic camera 10, an operation program and various constants are stored and an RAM that is a storing device to be a work area when a program is executed and a nonvolatile memory 182 that is capable of rewriting information and continuously storing stored information even after the power source is cut off.

Further, protocol stack software for dial-up (PPP, TCP/IP), a packet driver, browser software, a Chinese character font and the like can also be recorded in the above-described system memory 181.

In addition, the electronic camera 10 is provided with a calendar clock 190 recording the passing moments, a light-emitting device 193 which emits light to a subject and supplements shortage of an amount of light and a light emission controlling device 194 which performs adjustment of light emitting timing and an mount of light to be emitted of the light-emitting device 193.

The information processing device 180 of the electronic camera 10 and its peripheral circuits are connected by a bus 199, whereby information can be communicated at high speed among them.

Photographing processing of the electronic camera 10 configured as described above will be described.

An image to be photographed is imaged on a light receiving surface of an image pick-up device 150 with a lens 102 and an imaged subject image is photoelectrically converted and outputted to the image processing device 153. Image data obtained in this way is applied to amplification and processing for reducing noise by the image processing device 153, converted to digital data by the A/D converter 154 and, then, temporarily stored in the frame memory 171.

The information processing device 180 instructs that the image data stored in the frame memory 171 be sequentially communicated to the D/A converter 170 and displays it on the displaying device 168 together with information generated by the OSD 169.

When a user presses the release button 107 provided in the inputting device 172, the information processing device 180 enters a mode for photographing a subject. Then, the information processing device 180 transfers the image data stored in the frame memory 171 to the compressing and decompressing device 167 and outputs an instruction to carry out compressing processing of the image data on predetermined conditions. The information processing device 180 then applies processing for sequentially recording the image data in the recording medium 177 to the recording medium interface 179.

Further, although the present invention has been described with reference to an embodiment in which a communication terminal is an electronic camera, the present invention is not limited to an electronic camera but the object of the present invention can also be attained by a communication terminal such as an audio player that is provided with a wireless communication function and is capable of recording voice information.

FIG. 5 is an external view of a cellular phone.

As shown in the figure, the cellular phone 40 is provided with an antenna 452 for wirelessly communicating with a public line, an antenna 456 for sending and receiving information to and from the electronic camera 10 or the like existing in a short distance, a displaying device 468 for displaying various kinds of information such as communication information and a schedule, inputting devices 472 for inputting, designating and selecting personal information such as a telephone number, characters and a schedule, a speaker 495 for functioning as a telephone receiver and, at the same time, outputting voices and a microphone 497 for inputting voices.

FIG. 6 is a block diagram of a signal processing system of the cellular phone.

According to the figure, an information transmission and reception portion of the cellular phone 40 is provided with the antenna 452, a transmitting and receiving device 453 for a public line (including functions of a transmitting device and a receiving device) and a transmission and reception buffer 454 for temporarily storing information sent and received on a real time basis that are for wirelessly communicating with a public line, and the antenna 456, a transmitting and receiving device 457 (including functions of a transmitting device and a receiving device) and a transmission and reception buffer 458 that are used as short distance wireless communicating devices.

In addition, the cellular phone 40 is provided with a displaying device 468 for displaying information such as an image and characters, a display controlling device 469 for outputting an image signal for display to the displaying device 468 based on an instruction of an information processing device and an I/O 473 for reading various kinds of information inputted by a user via the inputting devices 472 to transfer the information to the information processing device, which will be described later, and outputting a display instruction to a notifying device such as an LED based on an instruction from the information processing device.

In addition, the cellular phone 40 is provided with an information processing device (CPU) 480 for performing overall control of the cellular phone 40, a rewritable nonvolatile memory 482 for recording various constants concerning processing of a cellular phone and connection information such as a dial-up telephone number, attribute information, a URL (Uniform Resource Locators), an IP (Internet Protocol) address, a gateway information DNS (Domain Name System) in making communication connection to a communication apparatus on a network, a memory 484 including an ROM in which a program for operating the information processing device 480 and various constants are recorded and an RAM that becomes a work area when the information processing device 480 executes processing, a calendar clock 490 recording the passing moments and a power source 491 for supplying power to each circuit including the information processing device 480.

The information processing device 480 and each peripheral circuit including the transmission and reception buffer 454, the transmission and reception buffer 458, the display controlling device 469, the I/O 473, the nonvolatile memory 482, the memory 484, the calendar clock 490 and the like inside the cellular phone 40 are connected by a bus 499, whereby the information processing device 480 can control respective peripheral circuits.

The wireless communicating device for short distance is a communicating device using an electric wave, an ultrasonic wave, light such as an infrared ray and a carrier wave. If an electric wave is used, the wireless communicating device may be based on a specification of wireless communication such as a wireless LAN (Local Area Network).

Further, although the present invention has been described with reference to an example in which a cellular phone is used, the present invention may be a communication terminal such as a personal computer and an electronic notebook as long as it is a communication apparatus provided with a recording device, a communicating device and the like.

A table of FIG. 7 shows information of a telephone directory recorded in the nonvolatile memory 482 of the cellular phone 40.

As shown in the figure, the information of a telephone directory includes setting information required for dial-up connection such as an attribute item showing classifications of communication device such as telephone, facsimile and dial-up, a name item showing names destinations of communication, a telephone number item showing ordinary telephone numbers or telephone numbers or the like of access points for dial-up connection, an IP address item showing information on whether or not a network parameter is automatically set, a DNS item showing DNS information or the like of destinations of communication, an item showing address information in converting a computer name into an IP address and items showing default URLs for accessing for the first time after connecting the Internet.

A procedure with which a user sends an image recorded in the recording medium 177 of the electronic camera 10 to the photograph laboratory 92 via the cellular phone 40 to receive a print service will be hereinafter described.

The user inputs a power source of the cellular phone 40 and sets the cellular phone 40 in a state in which communication is possible via short distance wireless communication and the cellular phone telephone public line 44. Next, the user operates the mode switching dial 108 of the electronic camera 10 to set it in a communication mode and operates the power switch 106 to put the electronic camera 10 in an activated state.

The electronic camera 10 automatically starts wireless communication with the cellular phone 40 of a user existing in the vicinity and wireless communication is established between respective communication apparatuses. When the communication apparatuses enters a state in which they can carry out communication mutually, the information processing device 480 of the cellular phone 40 reads out the information of a telephone directory such as attribute information of dial-up recorded in the nonvolatile memory 482 and sends it to the electronic camera 10 via the transmitting and receiving device 457.

When the transmitting and receiving device 157 of the electronic camera 10 receives the information of a telephone directory, the information processing device 180 instructs the displaying device 168 to display the received information of a telephone directory.

FIG. 8 illustrates selection menus of dial-up connection destinations displayed on the displaying device of the electronic camera.

According to the figure, the displaying device 168 of the electronic camera 10 shows names of servers in destinations of communication such as Sato Photograph Laboratory and Image Sharing Service. A user can easily select a desired destination of communication by operating the increment button 111, the decrement button 112, the setting button 110 and the like.

When the user selects a desired destination of communication, a processing program of the electronic camera 10 activates software required for communication such as browser software, a protocol stack and a packet driver and starts connection with the access point 46 via the cellular phone 40 using information of a telephone directory such as a number or the like of a dial-up attribute received from the cellular phone 40.

When the electronic camera 10 and the access point 46 start communication directly via the cellular phone 40, a contract ID and a password of the user are sent to the access point 46, whereby connection to the Internet becomes possible.

In addition, instead of the electronic camera 10 receiving the information of a telephone directory for connecting to the Internet 48 from the cellular phone 40 to directly perform dial-up connection as described above, the cellular phone 40 may perform processing of dial-up connection.

In this case, when a user selects a desired destination of communication, the processing program of the electronic camera 10 activates software required for communication such as browser software, a protocol stack and a packet driver and sends information on a name of a server in the selected destination of communication to the cellular phone 40. Upon receiving the information on the server in the destination of communication, the cellular phone 40 reads out a telephone number for dial-up of a corresponding telephone directory and starts connection with the access point 46 via the cellular phone public line 44. When the connection is completed and communication is established, since the cellular phone 40 makes communication open to the electronic camera 10, it becomes possible for the electronic camera 10 and the access point 46 to carry out communication directly.

Further, the contract ID and the password for connecting the Internet 48 may be recorded in the nonvolatile memory 482 or the like of the cellular phone 40, read out when the cellular phone 40 is connected to the access point 46 and sent by the cellular phone 40 to establish communication or may be recorded in a nonvolatile memory of the electronic camera 10.

When communication is established as described above, the electronic camera 10 is connected to the Internet 48 and sends destination information, which is a server name of a destination of communication designated by the user in advance converted to a URL or a domain name, and address information and data of the electronic camera 10 in the origin of transmission on the Internet.

Then, the electronic camera 10 receives menu information from, for example, the photograph laboratory 92 in a destination of connection via the cellular phone 40 and the browser software of the electronic camera 10 displays a service menu shown in FIG. 9 on the displaying device 168. The user selects a desired service from the displayed service menu, browses images in accordance with Web menus or uploads images and voice information recorded in the electronic camera 10, whereby it becomes possible to easily receive various services such as upload and download.

Other embodiments of a communication terminal and a communication system will be hereinafter described.

In the above-described embodiment, a user selects a desired service menu after the electronic camera 10 and the Internet 48 are connected. On the other hand, if a user decides a service that the user receives in advance, a batch file in which information of the service to be received is written in advance is prepared as described below and connection with the Internet 48 is started.

FIG. 10 shows a directory structure of image files and print order files that are recorded in the recording medium 177 of the electronic camera 10 in advance.

As shown in the figure, a print order file "PRT-IN-FO.TXT" (a form of a batch file describing contents of processing) is stored in a directory "¥Root¥ORDER" of the recording medium 177 (recording device). In addition, various image files are recorded in a directory "¥Root¥IMAGE".

FIG. 11 shows an example of a description of a print order file.

As shown in the figure, information such as a file name, the number of prints and a print type is written for each job in the print order file. When the electronic camera 10 receives a menu of destinations of communication for making communication connection to a communication apparatus on a network from the cellular phone 40, the information processing device 180 of the electronic camera 10 displays the menu information of the destination of communication on the displaying device 168. When the user designates a desired destination of communication via the inputting device 172, the information processing device 180 of the electronic camera 10 instructs the electronic camera 10 to connect communication with a communication apparatus on the above-described designated network.

Then, the electronic camera 10 reads out a print order file related to an apparatus on the network of the above-described designated destination of communication and an image file described in the print order file from the above-described recording medium 177 and, at the same time, sends them to a communication apparatus on the network.

In this way, since the electronic camera 10 is arranged to automatically send the print order file and the image file, which are prepared in advance, to the photograph laboratory 92 after dial-up connection is established, operation burdens for the user is reduced. Further, if an image or music information is downloaded, it becomes possible to send only a batch file to a predetermined server (communication apparatus) on a network to automatically download a desired image file, music information or the like.

In addition, as shown in FIG. 12, the attribute of a telephone directory recorded in the cellular phone 40 may be subdivided with the addition of an item for writing a service name, an item for writing a server type, an item for writing a communication protocol and the like. Thus, when the cellular phone 40 receives information of a print order service from the electronic camera 10, it automatically selects "xx photograph laboratory" as a destination of connection of "Print Service" to automatically upload the above-described print order file and image file.

In addition, when TCP/IP information such as an IP address and a DNS number is inputted in the cellular phone 40, if TCP/IP information set on a screen of a personal computer as shown in FIG. 13 is directly transmitted to the cellular phone 40 from the personal computer, it becomes possible to input accurate information without an error.

As described above, according to the communication terminal in accordance with the present invention, since the communication terminal is provided with a receiving device for receiving connection information such as a dial-up telephone number, attribute information, a URL, an IP address, gateway information and a DNS for making communication connection to a communication apparatus on a network and a transmitting and receiving device for sending and receiving information such as an image to and from the communication apparatus on the network based on the connection information received from the above-described cellular phone, it becomes possible to eliminate necessity of complicated setting inputs related to communication in the communication terminal in performing dial-up connection to the Internet or the like from the communication terminal.

In addition, according to the communication system in accordance with the present invention, since the communication system is composed of a cellular phone provided with a recording device which records connection information such as a dial-up telephone number, attribute information, a URL, an IP address, gateway information and a DNS for making communication connection to the communication apparatus on the network, a transmitting device which sends the above-described connection information to a communication terminal, a first receiving device which receives the information such as an image from the above-described communication terminal and a first transmitting and receiving device which sends and receives information to and from the communication apparatus on the above-described network and a communication terminal provided with a second receiving device which receives connection information for making communication connection to the communication apparatus on the network from the above-described cellular phone and a second transmitting and receiving device which sends and receives the information such as an image to and from the communication apparatus on the network based on the connection information received from the above-described cellular phone, it becomes possible to eliminate necessity of complicated setting inputs related to communication in the communication terminal in performing dial-up connection to the Internet or the like from the communication terminal.

The present invention is not limited to the above embodiments and various changes and modifications can be made within the spirit and scope of the present invention. Therefore, to apprise the public of the scope of the present invention the following claims are made.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A communication system which is capable of sending and receiving information to and from a communication apparatus on a network via a cellular phone, the communication system comprising:
   a cellular phone comprising:
      a recording device which records connection information for making communication connection to the communication apparatus on the network;
      a first transmitting device which sends the connection information to a digital camera unit;
      a first receiving device which receives information from the digital camera unit; and
      a second transmitting and second receiving device which sends and receives information to and from the communication apparatus on the network; and
   a digital camera unit comprising:
   a second receiving device which receives connection information for making communication connection to the communication apparatus on the network from the cellular phone;
   a first transmitting and first receiving device which sends and receives information to and from the communication apparatus on the network based on the connection information received from the cellular phone; and
   a display for displaying connection information received from the cellular phone,
   wherein the user selects a destination for a digital photographic image based on the displayed connection information.

2. The communication system according to claim 1, wherein the connection information includes at least one of a dial-up telephone number, attribute information, a URL, an IP address, gateway information and a DNS.

3. The communication system according to claim 1, wherein said digital camera further comprises:
   a mode switching element, which switches between a photographing mode for generating a digital image, and a communication mode for communicating a digital image to a destination based on connection information received from the cellular phone.

4. A communication system which is capable of sending and receiving information to and from a communication apparatus on a network via a cellular phone, the communication system comprising:
   a cellular phone comprising:
      a recording device which records a menu of destinations of communication and connection information for making communication connection to the communication apparatus on the network associating pieces of the connection information with each other;
      a first transmitting device which sends the menu to a digital camera unit;
      a first receiving device which receives information from a designated digital camera unit on the network; and
      a second transmitting and second receiving device which, upon receiving the information of the designated communication apparatus on the network from the digital camera unit, performs dial-up connection to the communication apparatus on the network and sends connection information and thereafter sends and receives information to and from the communication apparatus on the network; and
   a digital camera unit comprising:
      a second receiving device which receives the menu of destinations of connection for making communication connection to the communication apparatus on the network from the cellular phone;
      an inputting device which designates the communication apparatus on the network;
      a first transmitting and first receiving device which sends information of the designated communication apparatus on the network to the cellular phone and connects communication to the designated communication apparatus on the network to send and receive information; and
      a display for displaying a menu of destinations received from the cellular phone,
   wherein the user selects a destination for a digital photographic image based on the displayed menu of destinations.

5. The communication system according to claim 4, wherein the connection information includes at least one of a dial-up telephone number, attribute information, a URL, an IP address, gateway information and a DNS.

6. The communication system according to claim 4, wherein said digital camera further comprises:
   a mode switching element, which switches between a photographing mode for generating a digital image, and a communication mode for communicating a digital image to a destination based on the menu of destinations received from the cellular phone.

* * * * *